US012570011B2

(12) United States Patent
Brown et al.

(10) Patent No.: US 12,570,011 B2
(45) Date of Patent: Mar. 10, 2026

(54) ROBOTIC MANIPULATOR ARM

(71) Applicant: Teledyne FLIR Defense, Inc, Thousand Oaks, CA (US)

(72) Inventors: Christopher Thomas Brown, Lowell, MA (US); Jordan Daniel Jesiolowski, Chelmsford, MA (US); Elliott Forrest Leslie, Chelmsford, MA (US); Randall Miller, Chelmsford, MA (US)

(73) Assignee: Teledyne FLIR Defense, Inc, Thousand Oaks, CA (US)

( * ) Notice: Subject to any disclaimer, the term of this patent is extended or adjusted under 35 U.S.C. 154(b) by 622 days.

(21) Appl. No.: 17/562,941

(22) Filed: Dec. 27, 2021

(65) Prior Publication Data

US 2022/0203562 A1     Jun. 30, 2022

Related U.S. Application Data

(60) Provisional application No. 63/132,785, filed on Dec. 31, 2020.

(51) Int. Cl.
*B25J 17/02* (2006.01)
*B25J 5/00* (2006.01)
*B25J 9/16* (2006.01)
*B25J 19/02* (2006.01)

(52) U.S. Cl.
CPC .............. *B25J 19/023* (2013.01); *B25J 5/005* (2013.01); *B25J 9/1689* (2013.01); *B25J 17/02* (2013.01)

(58) Field of Classification Search
CPC ........ B25J 17/02; B25J 19/023; B25J 9/1689; B25J 9/06; B25J 5/005; G05B 2219/40591; G05B 2219/40611
See application file for complete search history.

(56) References Cited

U.S. PATENT DOCUMENTS

| | | | |
|---|---|---|---|
| 4,636,137 A | | 1/1987 | Lemelson |
| 4,993,912 A | * | 2/1991 | King ...................... B62D 61/12 |
| | | | 89/929 |
| 8,176,808 B2 | | 5/2012 | Fisk et al. |
| 8,322,249 B2 | * | 12/2012 | Seavey ................... B25J 5/005 |
| | | | 74/490.04 |
| 8,406,923 B2 | | 3/2013 | Ueyama et al. |
| 8,606,398 B2 | * | 12/2013 | Eakins ................... B25J 13/085 |
| | | | 901/29 |
| 8,721,198 B2 | | 5/2014 | Chapman |

(Continued)

FOREIGN PATENT DOCUMENTS

| | | |
|---|---|---|
| DE | 102011018440 | 12/2011 |
| JP | 2020150297 A * | 9/2020 |

OTHER PUBLICATIONS

Duddu, Praveen, "Detect and diffuse—The top 5 military robots for explosive ordnance disposal", Sep. 14, 2014, retrieved online: https://www.army-technology.com/analysis/featuredetect-and-diffuse-the-top-5-military-robots-for-explosive-ordnance-disposal-4372678/.

(Continued)

*Primary Examiner* — Thai T Dinh
(74) *Attorney, Agent, or Firm* — Haynes and Boone, LLP

(57) ABSTRACT

A robot may include a manipulator arm including a plurality of links and one or more grippers configured to perform a gripper work. A camera may be positioned at an end of the manipulator arm to provide a direct line of sight to the grippers and observe the gripper work from above the grippers.

20 Claims, 7 Drawing Sheets

(56)　　　References Cited

U.S. PATENT DOCUMENTS

| | | | | |
|---|---|---|---|---|
| 8,918,214 | B2 * | 12/2014 | Bosscher | B25J 9/1689 |
| | | | | 700/264 |
| 8,954,195 | B2 * | 2/2015 | Summer | B25J 13/081 |
| | | | | 700/258 |
| 8,958,916 | B2 * | 2/2015 | Setrakian | B25J 9/104 |
| | | | | 414/469 |
| 9,770,823 | B2 * | 9/2017 | Huang | B25J 19/023 |
| 10,414,039 | B2 | 9/2019 | Meeker et al. | |
| 10,471,599 | B1 * | 11/2019 | Guerin | B25J 9/0093 |
| 10,486,311 | B2 * | 11/2019 | Mozeika | B25J 13/065 |
| 11,146,045 | B2 * | 10/2021 | Kozel | B25J 13/00 |
| 2012/0095619 | A1 * | 4/2012 | Pack | G05D 1/0016 |
| | | | | 701/2 |
| 2013/0325182 | A1 * | 12/2013 | Setrakian | B25J 9/161 |
| | | | | 700/264 |
| 2015/0273684 | A1 * | 10/2015 | Huang | B25J 9/1697 |
| | | | | 901/47 |
| 2015/0276684 | A1 * | 10/2015 | Seuthe | G01N 29/14 |
| | | | | 73/579 |
| 2018/0236654 | A1 * | 8/2018 | Mozeika | B25J 9/02 |
| 2018/0264641 | A1 * | 9/2018 | Kemp | B25J 11/008 |

OTHER PUBLICATIONS

Aylward, Mary Kate, "How Many Robots Does It Take?", Army ALT Magazine, Science and Technology, Nov. 29, 2017, retrieved online: https://asc.army.mil/web/news-alt-jfm18-how-many-robots-does-it-take/.

Caliber T5, Compact, Two-Man Portable System, Icor Technology, 2016, retrieved online: https://icortechnology.com/robots/caliber-t5/.

* cited by examiner

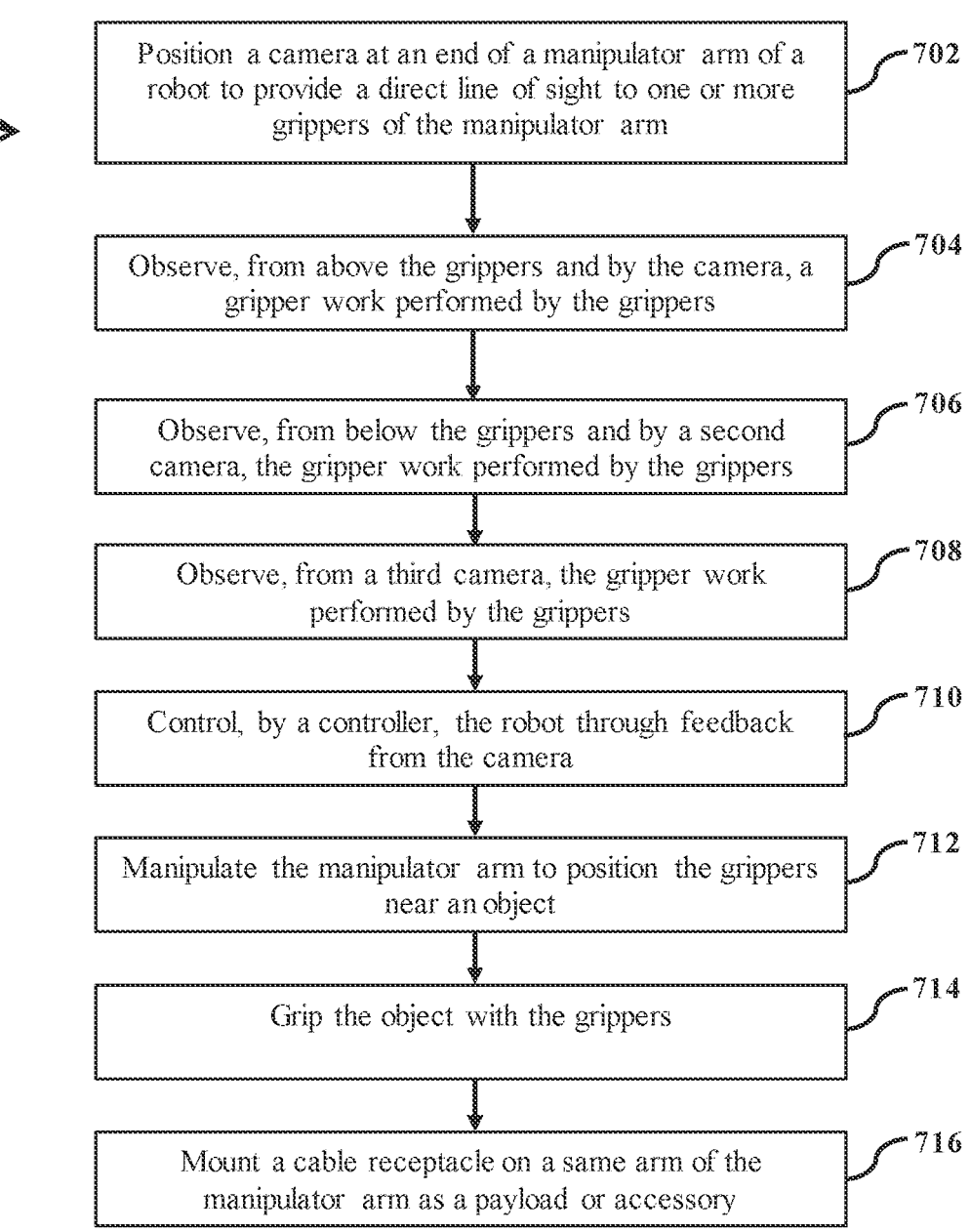

700

Position a camera at an end of a manipulator arm of a robot to provide a direct line of sight to one or more grippers of the manipulator arm — 702

Observe, from above the grippers and by the camera, a gripper work performed by the grippers — 704

Observe, from below the grippers and by a second camera, the gripper work performed by the grippers — 706

Observe, from a third camera, the gripper work performed by the grippers — 708

Control, by a controller, the robot through feedback from the camera — 710

Manipulate the manipulator arm to position the grippers near an object — 712

Grip the object with the grippers — 714

Mount a cable receptacle on a same arm of the manipulator arm as a payload or accessory — 716

FIG. 7

ROBOTIC MANIPULATOR ARM

CROSS-REFERENCE TO RELATED APPLICATIONS

This application claims the benefit of and priority to U.S. Provisional Patent Application No. 63/132,785 filed Dec. 31, 2020 and entitled "ROBOTIC MANIPULATOR ARM," which is incorporated herein by reference in its entirety.

TECHNICAL FIELD

One or more embodiments of the present disclosure relate generally to a robotic manipulator arm and more particularly, for example, to systems and methods for one or more cameras, sensors, or accessory modules integrated with the robotic manipulator arm.

BACKGROUND

Mobile robots (e.g., tactile mobile robots) often include a camera (e.g., a search camera) configured to provide visual feedback to an operator of the robot (e.g., for surveillance of a threat or robot operation itself). In prior designs, the search camera is implemented on an actuated link or mechanism separate from the manipulator arm of the robot, which may make the search or surveillance task more difficult.

In prior designs, accessory and basic input/output (I/O) ports were located low on the robot platform, such that cables needed to extend from manipulator-mounted accessories down to the bottom of the system. This configuration creates a unique set of challenges for sufficient cable routing, since the dynamic joints of the manipulator arm need to operate unencumbered by the cables, or else damage to the system may occur (e.g., tearing the cables from the arm or robot).

Therefore, there is a need in the art for systems and methods that address the deficiencies noted above, other deficiencies known in the industry, or at least offers an alternative to current techniques. For example, improvements are needed for one or more cameras, sensors, or accessory modules integrated with a manipulator arm of a robot.

SUMMARY

Techniques are disclosed for a robotic manipulator arm. In accordance with one or more embodiments, a robot is provided. The robot may include a manipulator arm including a plurality of links and one or more grippers configured to perform a gripper work (which may also be referred to or be considered a manipulation task, as would be understood by one skilled in the art). A camera may be positioned at an end of the manipulator arm to provide a direct line of sight to the grippers and observe the gripper work from above the grippers.

One or more embodiments provide a method of controlling a robot. The method may include positioning a camera at an end of a manipulator arm of a robot to provide a direct line of sight to one or more grippers of the manipulator arm. The method may include observing, from above the grippers and by the camera, the gripper work performed by the grippers.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. In addition, various aspects and features may be omitted. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

FIG. 7 illustrates a flow diagram of a process of controlling a robot, in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

The present disclosure is generally directed toward integrating one or more cameras, sensors or accessory modules with a manipulator arm of a robot. It is essential for mobile robots (e.g., tactical mobile robots) to be able to sense the world around them so that the operators can stay out of harm's way while effectively surveilling and removing threats. Placing a camera (e.g., a search camera) on the manipulator arm of the robot may provide for more integrated operation without a lot of added complexity. The above configuration may also increase operator awareness as the operator of the robot controls the robot through feedback from the camera. Positioning the camera at the end of the manipulator arm may also provide an optimal location for viewing all around the robot without obstruction. The above positioning may also allow the operator to move the manipulator arm in such a way to get the longest reach over and around obstacles.

Robot operators often have a lot of variables to control on a robot. By combining some of these variables into a common mechanism, the present disclosure simplifies the operation and control of the robot vehicle. This may result in more intuitive operation and less time training. The above configuration may also streamline operation of the robot so that previously complex tasks may be accomplished in a shorter time, making the robot more efficient.

Accessories are often mounted to a link of the manipulator arm. These accessories often interface with the robot through a cable for power and input/output (I/O) communications. By adding a cable receptacle on one or more links of the manipulator arm, such as on the same link as the one or more accessories, the cable lengths can be shortened, and cable management may be simpler due to the cable not passing over a mobile joint of the manipulator arm. The above configuration may also reduce the risk of the cable catching on objects or the manipulator arm itself during robot operation.

Figure 1:
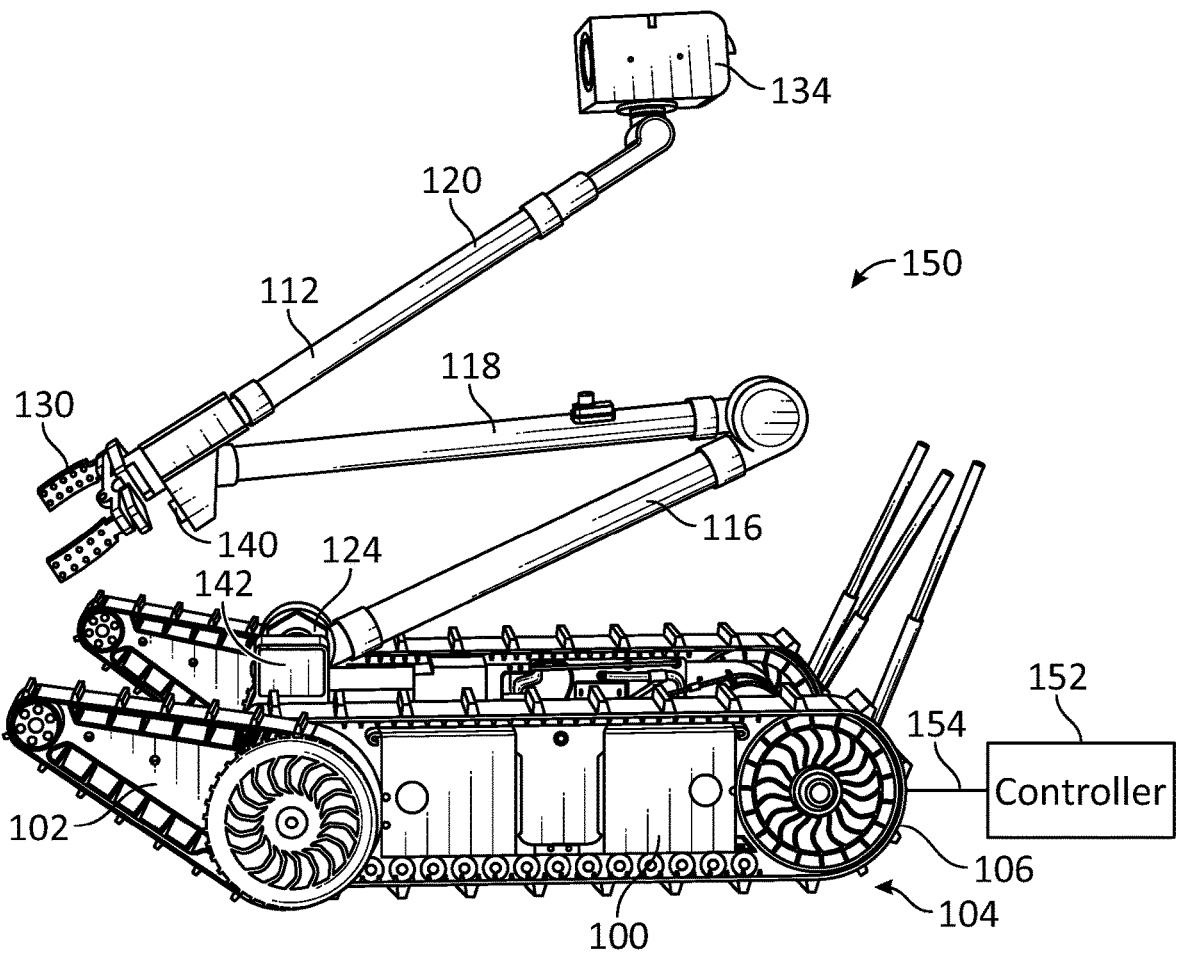
FIG. 1 illustrates a diagram of a robot, in accordance with an embodiment of the disclosure.

FIG. 1 illustrates a diagram of a robot 100, in accordance with an embodiment of the disclosure. Referring to FIG. 1, the robot 100 (e.g., a robot vehicle) may be a mobile robot, such as a tactical mobile robot, controlled by remote operators. For example, the robot 100 may be configured to move and sense the conditions around the robot 100 so that operators of the robot 100 can stay out of harm's way while effectively surveilling and removing threats. Although FIG. 1 illustrates a tactical mobile robot, the robot 100 may include other configurations. For example, concepts of the present disclosure may be embodied on a stationary robot or other configurations.

As shown, the robot 100 may include a mobile platform 102. The mobile platform 102 may be configured to traverse the robot 100 across a surface. For example, the mobile platform 102 may include a propulsion or drive system 104 operable to move the robot 100 to a desired position. The drive system 104 may include any number of wheels or tracks 106 (e.g., a pair of tracks 106) designed to provide traction to traverse the robot 100 across a terrain. The wheels or tracks 106 may be driven by a transmission. The transmission may be driven by a motor (e.g., an electric motor). The transmission may include any number of gears, pulleys, or other mechanical mechanisms to transfer power from the motor to the wheels or tracks 106. The robot 100 may include a power source (e.g., one or more batteries) to provide power to the motor and/or other modules of the robot 100 (e.g., control modules, sensors, cameras, accessories, etc.).

With continued reference to FIG. 1, the robot 100 may include a manipulator arm 112. The manipulator arm 112 (e.g., which may be referred to as a robotic arm, an arm, or a manipulator) may be an electronically controlled mechanism that performs tasks by interacting with its environment. For example, the manipulator arm 112 may manipulate materials or objects without direct physical contact by an operator of the robot 100. The manipulator arm 112 may be designed to move in one or more degrees of freedom. Depending on the application, the manipulator arm 112 may lift, maneuver, or place objects as desired, such as for automation, tactical, remote manipulation of tools or objects, or other applications.

The manipulator arm 112 may include a plurality of links connected by joints allowing rotational and/or translational (linear) motion or displacement. For example, the manipulator arm 112 may be a 3-link arm, with a first link 116, a second link 118, and a third link 120, although other configurations are contemplated. As shown, the robot 100 may include a turret 124 connecting the manipulator arm 112 to the mobile platform 102. The turret 124 may allow the manipulator arm 112 to rotate relative to the mobile platform 102. For example, the turret 124 may allow the manipulator arm 112 to pan relative to the mobile platform 102 (e.g., about a vertical axis).

The manipulator arm 112 may include one or more grippers 130 (e.g., a pair of grippers 130) configured to perform a gripper work. The grippers 130 (e.g., which may be referred to as manipulators, effectors, or gripper maneuvers) may be configured to handle objects. The grippers 130 may be configured based on a desired manipulation of the objects. For example, the grippers 130 may include one or more fingers or claws to grasp objects. In some embodiments, the grippers 130 may include suction cups, magnetized tips, or balls to manipulate the objects in different manners. The configuration of the grippers 130 may be based on the objects to be handled (e.g., textiles, electronics components, automotive parts, explosive devices, organic materials, etc.) and/or the payload, for instance. As a result, "grippers" may refer to any device or mechanism operable to handle an object, and in no way limits the grippers 130 to any particular structure or embodiment.

The terminus of the manipulator arm 112 may include a camera 134. The camera 134 (e.g., which may be referred to as a head or search camera) may be positioned at the end of the manipulator arm 112 to provide a direct line of sight to the grippers 130 and observe the gripper work from above the grippers 130. Positioning the camera 134 at the end of the manipulator arm 112 may also allow the manipulator arm 112 to be fully extended so that the camera 134 is at a maximum height for inspection of the robot's environment.

With continued reference to FIG. 1, the robot 100 may include one or more additional cameras. For instance, the robot 100 may include at least one of a second camera 140 and a third camera 142. The second camera 140 may be positioned at the grippers 130 to observe the gripper work from below. The third camera 142 may be positioned at the turret 124, such as to provide a wide field-of-view for viewing the gripper work and flexibility to inspect in front of or behind the robot 100. The second camera 140 and/or the third camera 142 may provide a perspective in addition to the view provided by camera 134. As a result, an operator of the robot 100 may be provided with a clearer picture of the object to be handled and/or the environment surrounding the robot 100.

Continuing to refer to FIG. 1, the robot 100 may be part of a system 150 including a controller 152. The controller 152 may be configured to control operation of the robot 100. For example, the controller 152, which may be operated by an operator, may send a control signal to the robot 100 to control one or more operations of the robot 100. Depending on the application, the controller 152 may be connected to the robot 100 via wired or wireless protocols. For example, control signals generated by controller 152 may be sent to robot 100 wirelessly or via a wired connection (e.g., via a control cable 154). The control cable 154 may be any type of cable facilitating wired communication between the controller 152 and the robot 100. For instance, the control cable 154 may be a fiber optic cable or other cable permitting one or more communication and/or power signals to travel between the controller 152 and the robot 100. In embodiments, the control cable 154 may be omitted, and the controller 152 may communicate with robot 100 wirelessly (e.g., Bluetooth, Wi-Fi, satellite communication, cellular communication, etc.).

Figure 2:
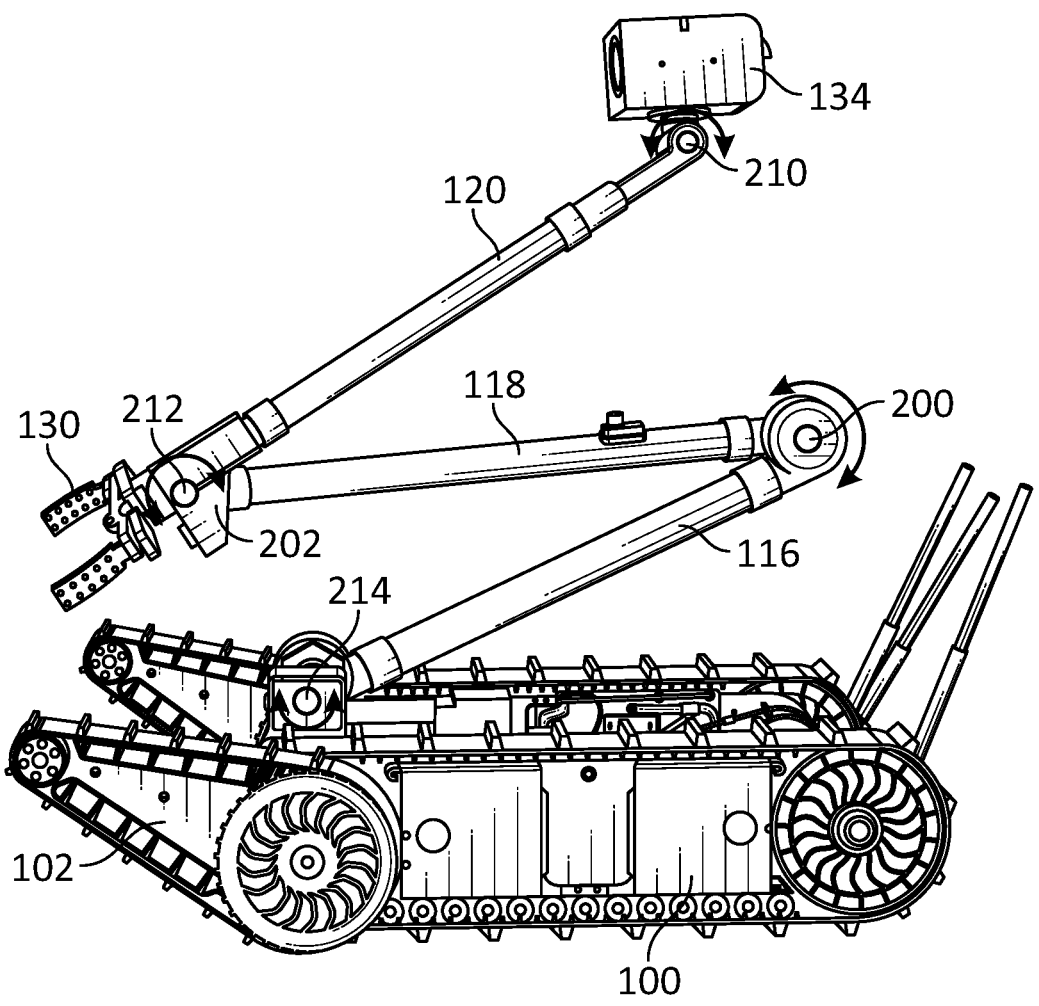
FIG. 2 illustrates another diagram of the robot, in accordance with an embodiment of the disclosure.

FIG. 2 illustrates another diagram of the robot 100, in accordance with an embodiment of the disclosure. Referring to FIG. 2, the robot 100 may include a plurality of joints connecting the plurality of links together. For example, the robot 100 may include a first elbow joint 200 rotatably connecting the second link 118 to the first link 116, and a second elbow joint 202 rotatably connecting the third link 120 to the second link 118. The first elbow joint 200 may allow articulation of the second link 118 relative to the first link 116. The second elbow joint 202 may allow articulation of the third link 120 relative to the second link 118. The grippers 130 may be positioned at the second elbow joint 202. The camera 134 may be positioned at a far end of the third link 120 and aligned so that the camera 134 has a direct line of sight to the grippers 130 at the second elbow joint 202.

As shown, the various cameras may be tilted to direct the cameras as desired. For example, the camera 134 may be tilted about a first tilt axis 210 defined at the connection of the camera 134 with the third link 120. The camera 134 may be tilted about the first tilt axis 210 to align the camera 134 with the grippers 130 (e.g., such that the camera 134 has a direct line of sight to the grippers 130). The second camera 140 may be tilted about a second tilt axis 212 defined at the connection of the second camera 140 with the manipulator arm 112. The second camera 140 may be tilted about the second tilt axis 212 to provide a desired field-of-view of the gripper work (e.g., to align the second camera 140 with the grippers 130). The third camera 142 may be tilted about a third tilt axis 214 defined at the connection of the third camera 142 with the robot 100. The third camera 142 may be tilted about the third tilt axis 214 to provide a desired field-of-view of the gripper work and/or the area in front of or behind the robot 100.

Figure 3:
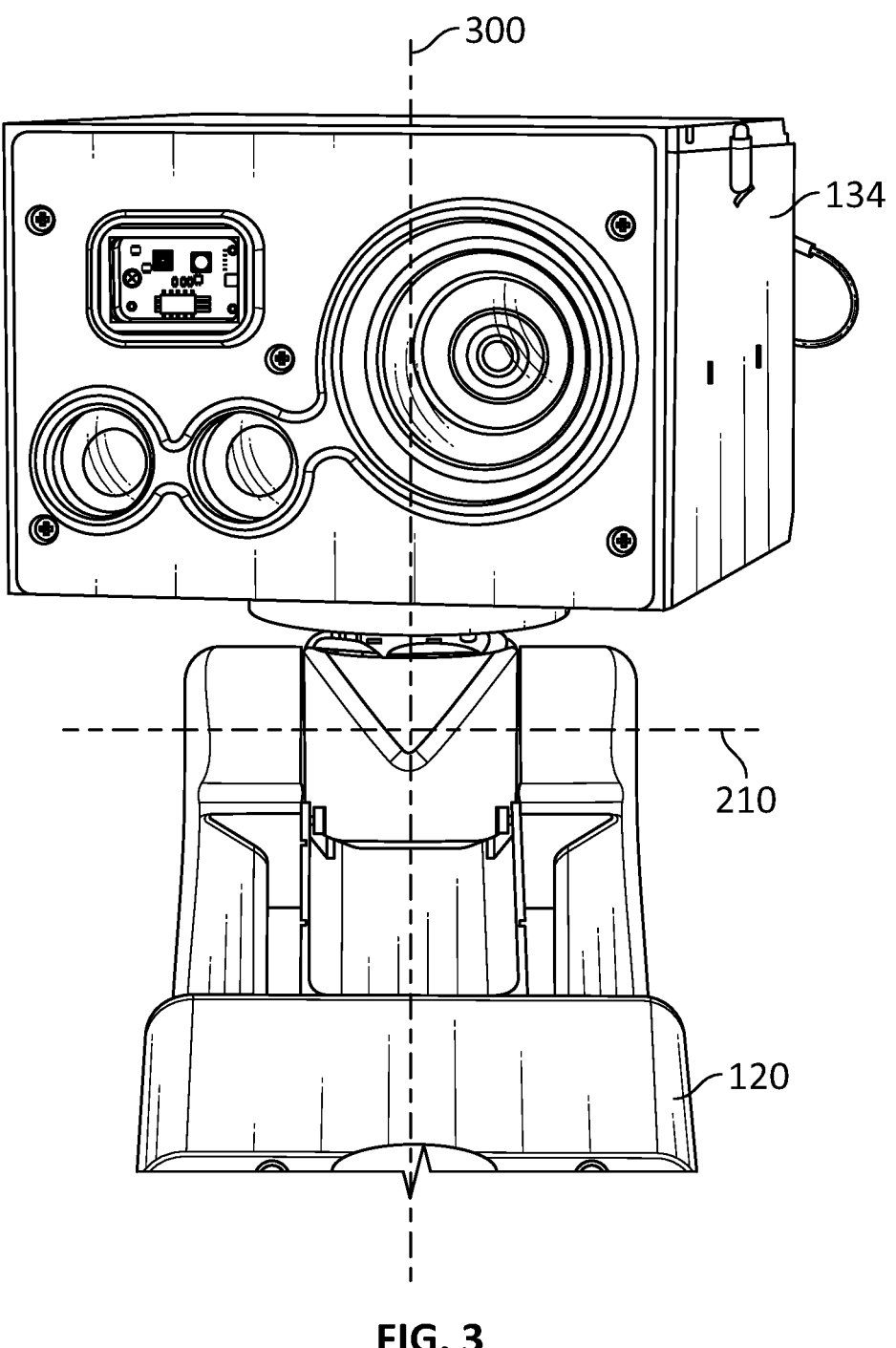
FIG. 3 illustrates a diagram of a camera of the robot, in accordance with an embodiment of the disclosure.

FIG. 3 illustrates a diagram of camera 134, in accordance with an embodiment of the disclosure. Referring to FIG. 3, the camera 134 may be configured to pan, tilt, and zoom to provide a desired field-of-view of the camera 134. For example, in addition to the first tilt axis 210, a pan axis 300 may be defined at the connection of the camera 134 with the third link 120. As a result, the camera 134 may be panned about the pan axis 300 and tilted about the first tilt axis 210 to orient the camera 134 as desired. Control of the camera 134 in pan and tilt axes, as well as zoom, may provide infinitely variable control of camera 134 for inspection tasks at any position around the robot 100.

Figure 4:
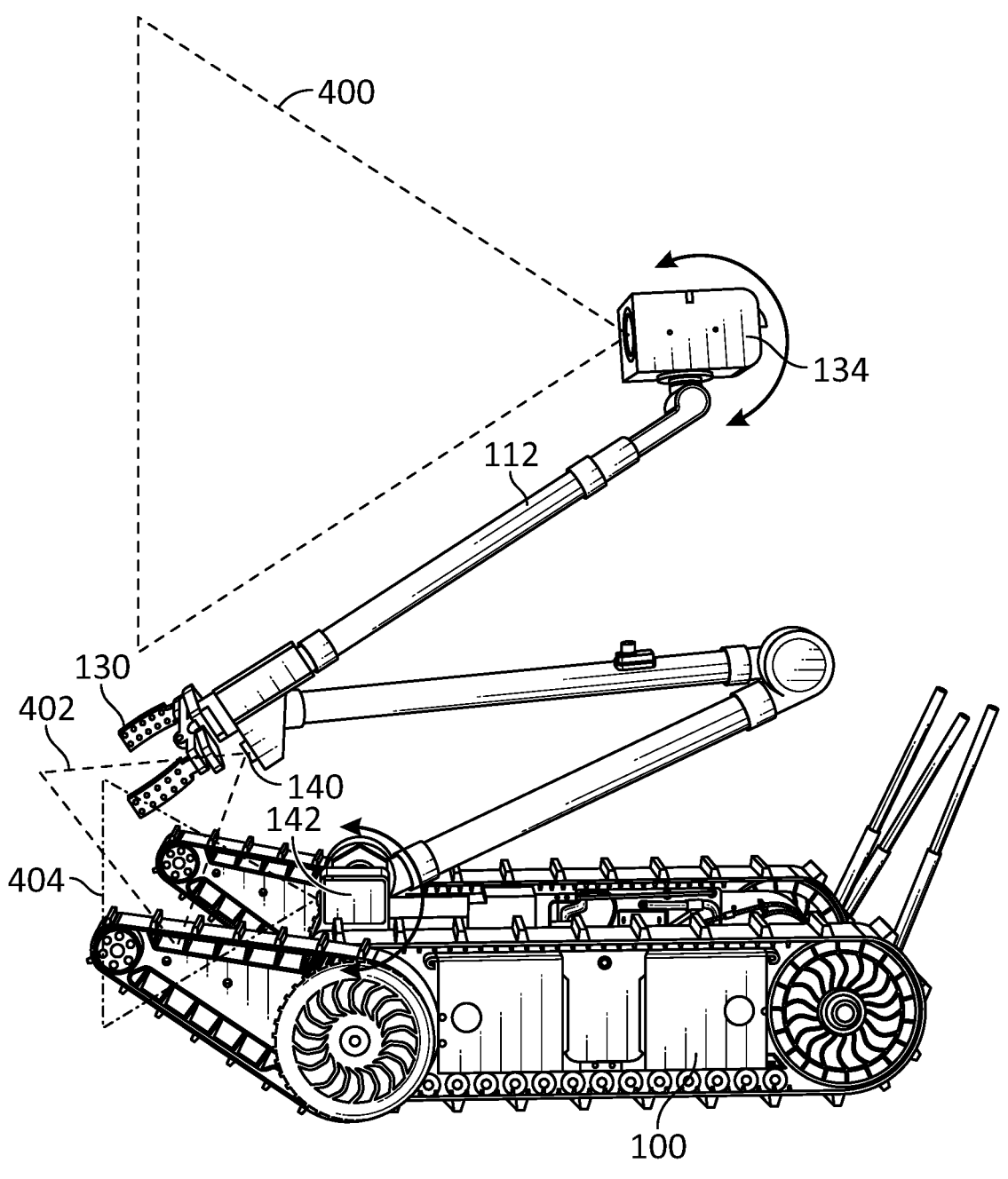
FIG. 4 illustrates another diagram of the robot and illustrating various field-of-views of respective cameras, in accordance with an embodiment of the disclosure.

FIG. 4 illustrates another diagram of the robot 100 and illustrating various field-of-views of respective cameras, in accordance with an embodiment of the disclosure. Referring to FIG. 4, the camera 134 may provide a first field-of-view 400, the second camera 140 may provide a second field-of-view 402, and the third camera 142 may provide a third field-of-view 404. The field-of-views may overlap, stack, or otherwise to provide an operator a desired view of the gripper work and/or the area surrounding the robot 100. For example, the first field-of-view 400 of camera 134 may provide the operator the capability to inspect the robot's surroundings, with the camera 134 positioned on the manipulator arm 112 allowing for ease of control and quick response. In embodiments, the first field-of-view 400 may allow the operator to observe, from above, the work performed by the grippers 130. The second field-of-view 402 of second camera 140 may allow the operator to observe, from below, the items grasped or to be grasped by the grippers 130. The third field-of-view 404 of third camera 142 may provide a wider field-of-view for viewing the gripper work and flexibility to inspect in front of or behind the robot 100.

Figure 5B:
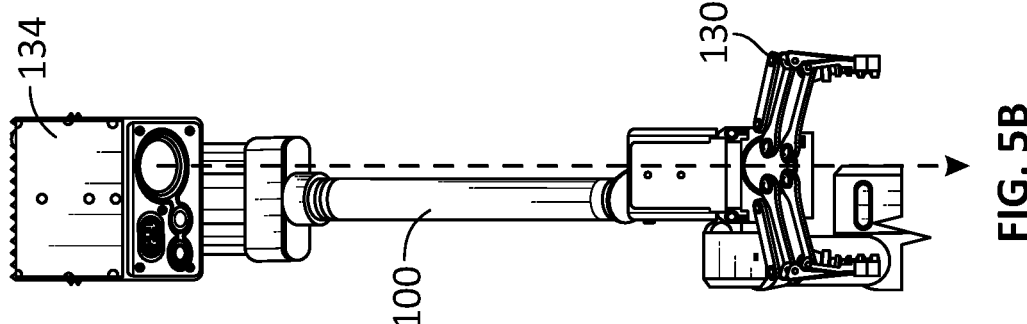
FIG. 5B illustrates an enlarged, fragmentary view of a portion of the robot of FIG. 5A, in accordance with an embodiment of the disclosure.
Figure 5A:
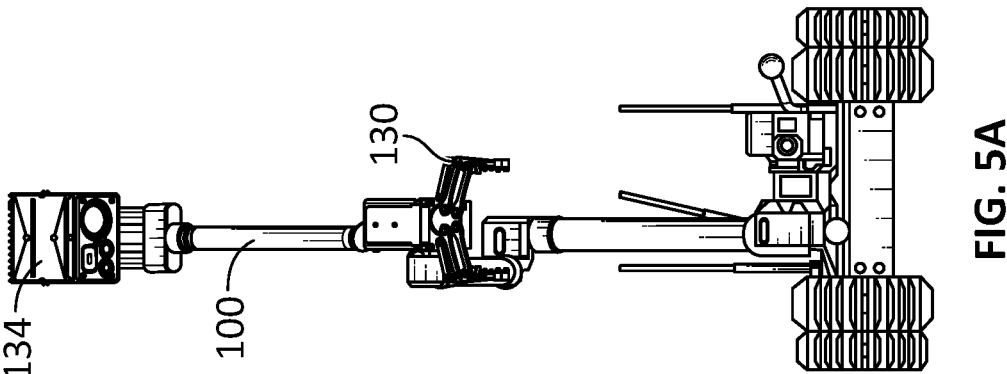
FIG. 5A illustrates a front view of the robot, in accordance with an embodiment of the disclosure.

FIG. 5A illustrates a front view of the robot 100, in accordance with an embodiment of the disclosure. FIG. 5B illustrates an enlarged, fragmentary view of FIG. 5A, in accordance with an embodiment of the disclosure. Referring to FIGS. 5A and 5B, camera 134 may be positioned to provide a direct line of sight to the work being performed at the grippers 130. The configuration illustrated in FIGS. 5A and 5B may provide a more natural point of view for the operator. In addition, or alternatively, if the view from below provided by second camera 140 is blocked by obstacles, then the point of view provided by the camera 134 may provide the perspective needed to complete gripper tasks.

Figure 6:
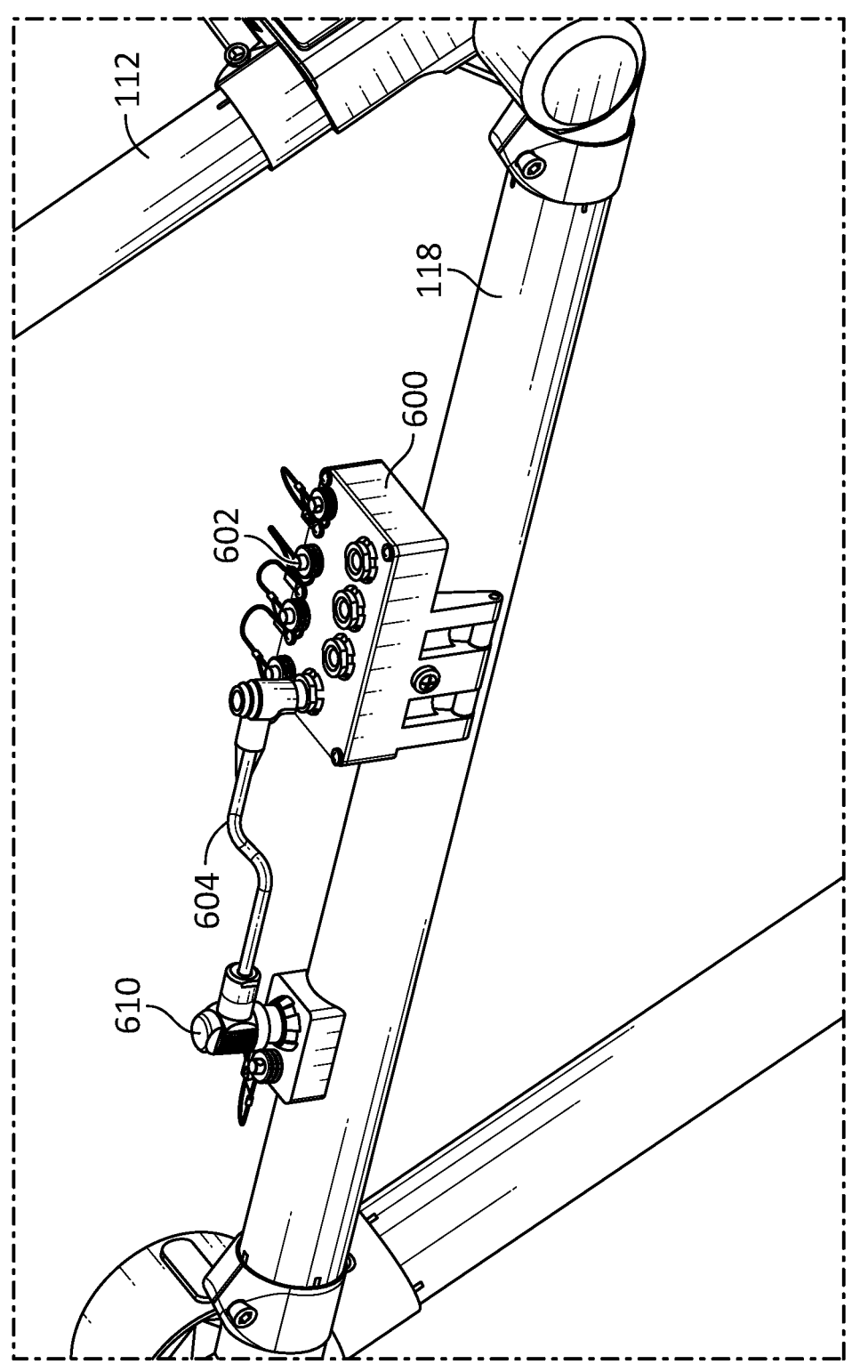
FIG. 6 illustrates a diagram of a cable receptacle mounted to a link of a manipulator arm of the robot, in accordance with an embodiment of the disclosure.

FIG. 6 illustrates a diagram of a cable receptacle 600 mounted to a link of the manipulator arm 112, in accordance with an embodiment of the disclosure. Referring to FIG. 6, the cable receptacle 600 may be integrated with a link of the manipulator arm 112. As shown, the cable receptacle 600 may be mounted to the second link 118, although other configurations are contemplated. The cable receptacle 600 may be configured to connect one or more accessories to the robot 100. For example, the cable receptacle 600 may include a plurality of ports 602 configured to connect a plurality of accessories to the robot 100. The ports 602 may provide power and/or I/O communications to the one or more accessories.

The cable receptacle 600 may be positioned to limit one or more cables 604 passing over a dynamic joint of the manipulator arm 112. For instance, the cable receptacle 600 may be attached to the same link of manipulator arm 112 as the accessory. For example, as shown in FIG. 6, the robot 100 may include a payload 610 mounted to a link of the manipulator arm 112 (e.g., to the second link 118). To reduce cable length between the payload 610 and the cable receptacle 600, the cable receptacle 600 may be attached to the same link as the payload 610. The above configurations may eliminate the need to run cables 604 across the joints of the manipulator arm 112, as well as decrease the amount of management hardware required to restrain the cables 604. The shortened cables 604 may also perform better, such as in terms of emitted electromagnetic interference (EMI) radiation, which lowers the noise floor of the system.

FIG. 7 illustrates a flow diagram of a process 700 of controlling a robot, in accordance with an embodiment of the disclosure. It should be appreciated that any step, substep, sub-process, or block of process 700 may be performed in an order or arrangement different from the embodiments illustrated by FIG. 7. For example, one or more blocks may be omitted from or added to the process 700. Although process 700 is described with reference to the embodiments of FIGS. 1-6, process 700 may be applied to other embodiments. The robot associated with process 700 may be similar to the robot 100 described above, although other configurations are contemplated.

In block 702, process 700 may include positioning a camera at an end of a manipulator arm of a robot to provide a direct line of sight to one or more grippers of the manipulator arm. For example, the camera may be positioned at a terminus of the manipulator arm, with the camera aligned to view the work performed by the grippers. The manipulator arm may include a plurality of links, such as a first link, a second link rotatably connected to the first link (e.g., at a first elbow joint), and a third link rotatably connected to the second link (e.g., at a second elbow joint). The grippers may be positioned at the second elbow joint. The camera may be positioned at a far end of the third link to view the grippers at the second elbow joint. The grippers may be configured to perform gripper work (e.g., handling of objects, etc.).

In block 704, process 700 may include observing, from above the grippers and by the camera, the gripper work performed by the grippers. For instance, the camera may provide a first field-of view of the grippers for viewing the work performed by the grippers. The first field-of-view may provide a natural point of view of the grippers for an operator of the robot.

In block 706, process 700 may include observing, from below the grippers and by a second camera, the gripper work performed by the grippers. For example, the second camera may provide a second field-of-view of the grippers for viewing the work performed by the grippers. The second field-of-view of second camera may allow the operator to observe, from below, the items grasped or to be grasped by the grippers. The second camera may be positioned at the grippers to observe the gripper work from below the grippers.

In block 708, process 700 may include observing, from a third camera, the gripper work performed by the grippers. The third camera may be positioned at a turret of the manipulator arm, such as described above. The third camera may provide a third field-of-view providing a wider field-of-view for viewing the gripper work. The third camera may also be positioned and configured to inspect or view an area in front of or behind the robot, such as to facilitate traversal of the robot across a surface.

In block 710, process 700 may include controlling, by a controller, the robot through feedback from the camera. Block 710 may include operating the grippers to manipulate an object as desired. In embodiments, block 710 may include traversing the robot across a surface.

In block 712, process 700 may include manipulating the manipulator arm to position the grippers near an object. In block 714, process 700 may include gripping the object with the grippers.

In block 716, process 700 may include mounting a cable receptacle on a same arm of the manipulator arm as a payload or accessory. The cable receptacle may be similar to cable receptacle described above. For example, the cable receptacle may include one or more ports (e.g., a plurality of ports) to provide power and/or I/O communications to the payload or accessory.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

All relative and directional references (including upper, lower, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. It should also be understood that numerous modifications and variations are possible in accordance with the principles of the present disclosure. Accordingly, the scope of the invention is defined only by the following claims.

What is claimed is:

1. A robot comprising:
   a manipulator arm comprising:
      a gripper configured to perform a gripper work;
      a first link;
      a second link rotatably connected to the first link at the first elbow joint; and
      a third link rotatably connected to the second link at a second elbow joint,
   wherein the gripper is positioned at the second elbow joint;
   a cable receptacle mounted on the second link of the manipulator arm to prevent one or more cables from passing over a dynamic joint of the manipulator arm, wherein the cable receptacle comprises at least one port configured to connect at least one accessory to the robot;
   a first camera positioned at an end of the third link to provide a first field-of-view comprising a direct line of sight to the gripper at the second elbow joint and observe the gripper work from above the gripper;
   a second camera positioned at the end of the second link and below the grippers, wherein the second camera provides a second field-of-view to observe the gripper work from below the grippers; and
   a third camera positioned proximate an end of the first link, wherein the third camera provides a third field-of-view that is wider than the second field-of-view.

2. The robot of claim 1, wherein:
   the third camera is positioned to provide the third field-of-view for viewing the gripper work and flexibility to inspect in front of and behind the robot.

3. The robot of claim 2, further comprising:
   a mobile platform configured to traverse the robot across a surface; and a turret connecting the manipulator arm to the mobile platform.

4. The robot of claim 3, wherein the third camera is positioned at the turret.

5. The robot of claim 3, wherein the mobile platform comprises a pair of tracks configured to traverse the mobile platform across a surface.

6. The system of claim 2, wherein the first field-of-view, the second field-of-view, and the third field-of-view at least partially overlap.

7. The robot of claim 1, wherein the first camera is configured to pan, tilt, and zoom to provide the first field-of-view.

8. The robot of claim 1, wherein the at least one accessory includes a payload mounted to the second link of the manipulator arm.

9. A system comprising:

the robot of claim 1; and a controller configured to control operation of the robot.

10. The system of claim 1, wherein the gripper comprises magnetized tips.

11. The robot of claim 1, wherein the at least one port is configured to provide power or I/O communications to the at least one accessory.

12. A method comprising:

positioning a first camera at an end of a third link of a manipulator arm to provide a first field-of-view comprising a direct line of sight to a gripper of the manipulator arm;

positioning a second camera at the end of a second link of the manipulator arm below the gripper, wherein the second link is rotatably connected to a first link at a first elbow joint;

positioning a third camera proximate an end of the first link of the manipulator arm, wherein the third link is rotatably connected to the second link at a second elbow joint, wherein the gripper is positioned at the second elbow joint;

connecting, using one or more cables, at least one accessory to at least one port of a cable receptacle mounted on the second link of the manipulator arm to prevent the one or more cables from passing over a dynamic joint of the manipulator arm;

observing, from above the gripper and by the first camera, a gripper work performed by the gripper;

observing, from below the gripper and by the second camera, the gripper work performed by the gripper, wherein the second camera provides a second field-of-view; and observing, by the third camera, the gripper work performed by the gripper, wherein the third camera provides a third field-of-view that is wider than the second field-of-view.

13. The method of claim 12, wherein the third camera provides the third field-of-view for viewing the gripper work and flexibility to inspect in front of and behind the robot.

14. The method of claim 13, wherein the third camera is positioned at a turret of the manipulator arm.

15. The method of claim 13, wherein the first field-of-view, the second field-of-view, and the third field-of-view at least partially overlap.

16. The method of claim 12, further comprising controlling, by a controller, the robot through feedback from one or more of the cameras; and wherein the controlling comprises:

manipulating the manipulator arm to position the grippers near an object; and gripping the object with the grippers.

17. The method of claim 16, wherein the controller comprises traversing the robot across a surface.

18. The method of claim 12, further comprising mounting a payload or accessory to the second link of the manipulator arm.

19. The method of claim 12, wherein the gripper comprises magnetized tips.

20. The method of claim 12, wherein the at least one port is configured to provide power or I/O communications to the at least one accessory.

\* \* \* \* \*